July 7, 1925.
J. C. STIMSON
1,544,782
ILLUMINATING DEVICE FOR AUTOMOBILES
Filed June 12, 1922
Fig. 1.
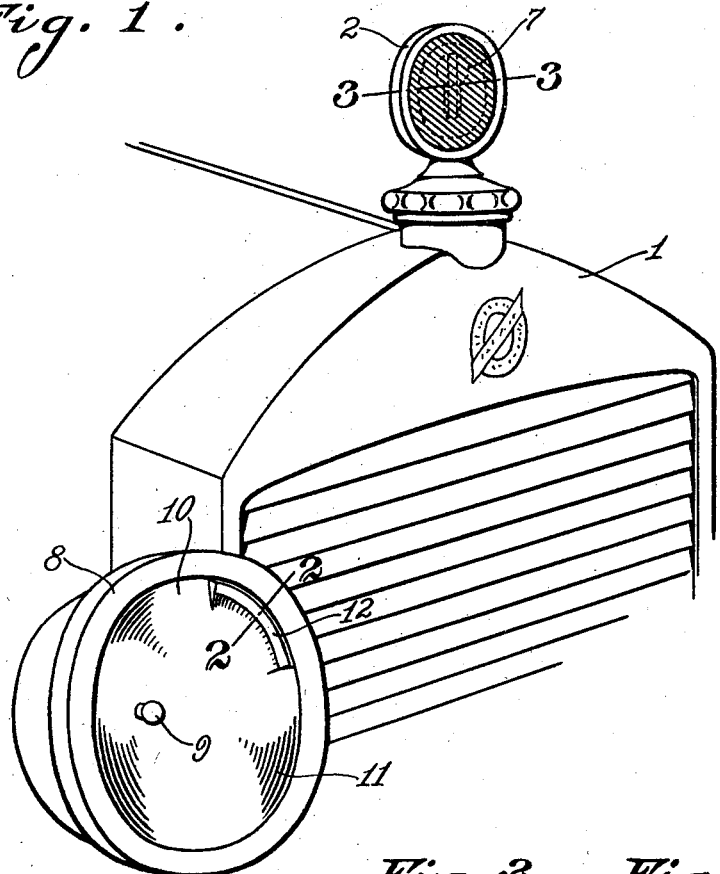
Fig. 4.
Fig. 3. Fig. 2.
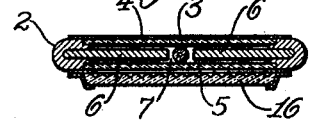
Fig. 6.
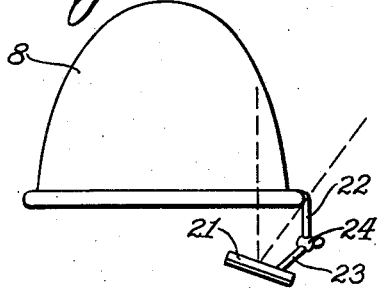
Fig. 5.
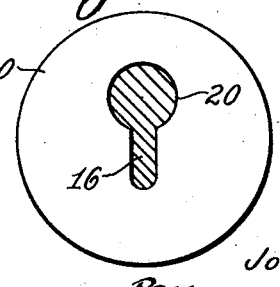
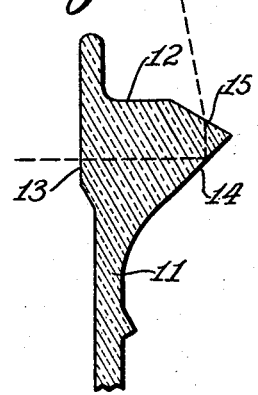
Inventor:
Jonathan C. Stimson,
Andrew B. Remick
His Attorney.

Patented July 7, 1925.

1,544,782

UNITED STATES PATENT OFFICE.

JONATHAN C. STIMSON, OF ST. LOUIS, MISSOURI, ASSIGNOR, BY DIRECT AND MESNE ASSIGNMENTS, TO SAID STIMSON, AS TRUSTEE.

ILLUMINATING DEVICE FOR AUTOMOBILES.

Application filed June 12, 1922. Serial No. 567,596.

*To all whom it may concern:*

Be it known that I, JONATHAN C. STIMSON, a citizen of the United States, and residing at St. Louis, Missouri, have invented a new and useful Improvement in Illuminating Devices for Automobiles, of which the following is a specification.

This invention relates to illuminating devices adapted more particularly for illuminating instruments or other parts of automobiles.

Automobiles are provided with various instruments which it is desired to illuminate so that they can be visible in the dark. One of such instruments is the usual indicating device placed on the radiator cap in order to determine the temperature of the water in the cooling system. Where separate sources of illumination are used to illuminate such instruments, those sources, of course, require additional equipment such as wiring, bulbs, lenses, switches, with a subsequent drain upon the current supply.

One of the objects of this invention, therefore, is to provide a device which is adapted to illuminate any instrument or desirable part of an automobile within its range without requiring the addition of a new source of illumination other than that already existing.

Another object of this invention is to provide a device whereby a part of the light from the head-light is so redirected as to illuminate the instrument or other part, but without interfering with the general illuminating function of such head-light.

Further objects will appear from the detail description taken in connection with the accompanying drawing, in which:

Figure 1 is a perspective view showing one embodiment of this invention;

Figure 2 is an enlarged section on line 2—2, Figure 1, but showing simply the lens or cover;

Figure 3 is a section on the line 3—3, Figure 1, showing the instrument to be illuminated and showing an embodiment of this invention;

Figure 4 is an enlarged detail of Figure 3;

Figure 5 is a back view of the instrument, illustrating still another embodiment of this invention; and Figure 6 is a view showing still another embodiment of this invention.

Referring to the accompanying drawing, and more particularly to Figures 1 to 4 inclusive, 1 designates the radiator of an automobile, which is provided with any existing form of indicating device 2 for indicating the temperature of the water in the cooling system. This device usually has a thermometer tube 3, a transparent front face 4, a back plate 5 which may be transparent, and opaque or semi-opaque parts 6 which may, however, be provided with an opening 7, so that the thermometer tube can be readily viewed.

The automobile is also provided with head-lights, one of which is shown at 8 and is provided with a lamp 9 and a reflector 10 and a lens or cover 11.

In accordance with this invention means are provided in the path of the rays from the reflector to redirect a beam laterally, upwardly and rearwardly to the back face of the instrument in order to illuminate the same and permit the observer in the front to note in the dark, the position of the usual indicating liquid in the tube 3.

In accordance with an embodiment of this invention as shown in Figure 2, the lens or cover 11 is provided with a prism 12 which extends circumferentially on the lens or cover near its rim, or it may be a prism of any desired length consisting of a cord or a part of a cord of an arc of said lens, as shown in Figure 1. This prism is provided with three surfaces 13, 14 and 15. The surface 14 is normal to the beam of light from the head-light and accordingly, this beam will pass directly into the prism until it strikes the surface 14 which is a totally reflecting surface, directing the beam upwardly and laterally so that it impinges upon the surface 15, which surface may be flat, as shown, or concave or convex according to the width or intensity of the beam desired. This surface 15 is not, however, set at such an angle as to totally reflect the beam, but rather to refract it in the direction shown in Figures 1 and 2 so as to strike the back face of the instrument as shown. This will cause the instrument to be illuminated.

In case a beam, directed as described, is simply thrown on the back face, the illumination will not be as intense and visible as desired, unless the reflecting elements are used on both head-lights, in which case the instrument will be sufficiently illuminated to be plainly visible, and would obviate the necessity of the prismatic glass plate. In accordance with this invention, as shown in Figures 3 and 4, the rear face of the instrument is provided with a glass plate, the outer surface of which is preferably smooth, while the inner surface of which is provided with prisms 17 having refracting surfaces 18 and 19. As shown in Figure 1, these prisms are placed so that their longitudinal axis is approximately at right angles to the beam projected by the prism 12. As the beam impinges on this plate, it will be refracted as shown in Figure 4, striking the surfaces 18 and will again be refracted, so as to leave the plate 16 in a direction towards the observer. It will be noted, however, that the surfaces 19 are practically parallel with the beam passing through the glass. It will, therefore, be seen that the provision of the prismatic lens 16 operates to cause the beam projected upon the back face of this prism on the instrument to be bent so as to leave the prismatic lens 16 practically normal to the surface of the instrument in order to pass directly through the opening 7 and towards the observer. This, in fact, throws a bright beam of light through the opening 7 in the instrument and on the indicating stem 3 and the liquid therein, thereby enabling the condition of the water in the cooling system to be readily observed.

As shown in Figure 5, the prismatic lens 160 need not be completely corrugated to form prisms, but only a part 20 corresponding to the opening 7 may be so corrugated. Accordingly the remaining face portion may be smooth and will permit the use of suitable inscriptions.

As shown in Figure 6, the prism 12 can be replaced by a simple reflector 21 which can be secured by a bracket 22 to the headlight frame and the stem 23 of this reflector can be adjustably secured by any suitable joint 24. It will be seen that this reflector is adapted to reflect a beam of light from the head-light on to the front of the instrument.

It is obvious that various changes may be made in details of construction without departing from the spirit of this invention; it is, therefore, to be understood that this invention is not to be limited to the specific details shown and described.

Having thus described the invention, what is claimed is:

1. In an automobile having a head light, an internal combustion engine provided with a radiator and an instrument on the radiator provided with an element adapted to indicate the thermal condition of the engine, a light-pervious head on said instrument adapted to provide a background for the indicating element, and means for reflecting a beam from the head light on the front of said head in order to render said element visible to the driver from the rear of the instrument.

2. In an automobile having a head light, an internal combustion engine provided with a radiator and an instrument on the radiator provided with an element adapted to indicate the thermal condition of the engine, a light-pervious head on said instrument provided with a refracting element adapted to form a background for the indicating element, and means for reflecting a beam from the head light on said refracting element in order to render said indicating element visible to the driver from the rear of the instrument.

3. In an automobile having a head light, an internal combustion engine provided with a radiator and an instrument on the radiator provided with an element adapted to indicate the thermal condition of the engine, a light-pervious head on said instrument adapted to provide a background for the indicating element, and a head light cover provided with a prism adapted to reflect a beam from the head light on the front of said head in order to render said element visible to the driver from the rear of the instrument.

4. In an automobile having a head light, an internal combustion engine provided with a radiator and an instrument on the radiator provided with an element adapted to indicate the thermal condition of the engine, a light-pervious head on said instrument provided with a refracting element adapted to form a background for the indicating element, a head light cover provided with a prism adapted to reflect a beam from the head light on the front of said head in order to render said indicating element visible to the driver from the rear of the instrument.

In testimony whereof I affix my signature this second day of June, 1922.

JONATHAN C. STIMSON.